United States Patent Office 2,717,261
Patented Sept. 6, 1955

2,717,261

SYMMETRICAL CYANO-CONTAINING COMPOUNDS AND THEIR PREPARATION

Carl George Krespan, Wilmington, Del., assignor to E. I. du Pont de Nemours and Company, Wilmington, Del., a corporation of Delaware No Drawing. Application May 6, 1954,
Serial No. 428,110

8 Claims. (Cl. 260—465.8)

This invention relates to symmetrical cyano-containing compounds and their preparation and, more particularly, to the preparation of such compounds through reactions with compounds generating free radicals.

The use of free radical-generating substances as catalysts for the polymerization of unsaturated compounds is well known. These catalysts are employed at concentrations less than 5% by weight of the unsaturated compound to be polymerized and high polymers are obtained. Further, U. S. Patent 2,561,068, granted July 17, 1951, to D. C. Pease, discloses that when 10% or more by weight of selected free radical-generating substances are employed, certain polymerizable unsaturated hydrocarbons yield equimolecular and multimolecular low molecular weight addition products of the unsaturated hydrocarbon and the free radicals from the free radical-generating substances. These low molecular weight addition products can be readily fractionated into their component chemical constituents which are terminally symmetrical compounds, the terminals representing free radicals from the free radical-generating substance and the molecular structure between the terminals representing one or more units from the unsaturated hydrocarbon.

An object of the present invention is to provide new chemical cyano-containing compounds. A further object is to provide such compounds adapted for use as insecticides and fumigants. Another object of the invention is to provide a convenient process of preparing such compounds. Other objects will be apparent from the description of the invention given hereinafter.

The above objects are accomplished according to the present invention by reacting tetracyanoethylene with alpha,alpha'-azobisnitriles having bonded to each nitrogen of the azo, —N=N—, group a tertiary carbon atom bearing a single cyano group, in the proportion of 1 mole of the tetracyanoethylene to at least one-half mole of the alpha,alpha'-azobisnitrile, whereby compounds of the formula R—[C(CN)₂—C(CN)₂]ₙ—R where $n$ is an integer from 1 to 2, inclusive, and R is an organic radical containing a tertiary carbon bonded to the central unit and bearing a single cyano group, are formed.

In a preferred form, the invention comprises reacting tetracyanoethylene with an alpha,alpha'-azobisnitrile having bonded to each nitrogen of the azo group a tertiary carbon atom bearing a single cyano group and having both its remaining bonds connected to separate carbons in radicals from the group consisting of alkyl, cycloalkyl, alkoxyalkyl, carboxyalkyl, and aryl radicals, preferably alkyl radicals, in the proportion of 1 mole of the tetracyanoethylene to at least one-half mole of the alpha,-alpha'-azobisnitrile in an inert organic liquid at a temperature between 0° C. and 200° C. at which the alpha,-alpha'-azobisnitrile will decompose to yield free radicals.

The preferred compounds of this invention are the symmetrical compounds having a central 1,2,2,3,3,4,-hexacyanobutylene unit in which carbons 1 and 4 have both their remaining bonds connected to separate carbons in radicals from the group consisting of alkyl, cycloalkyl, alkoxyalkyl, carboxyalkyl, and aryl radicals, preferably alkyl radicals, and the symmetrical compounds having a central 1,2,2,3,3,4,4,5,5,6-decacyanohexylene unit in which carbons 1 and 6 have both their remaining bonds connected to separate carbons in radicals from the group consisting of alkyl, cycloalkyl, alkoxyalkyl, carboxyalkyl, and aryl radicals preferably alkyl radicals.

In carrying out the preferred form of this invention, nitrile-containing free radicals are generated by the thermal decomposition of an alpha,alpha'-azobisnitrile in an inert solvent which contains dissolved tetracyanoethylene. Under these conditions, the primary reaction which occurs is the combination of two of the free radicals with 1 molecule of tetracyanoethylene:

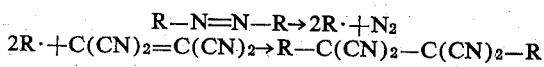
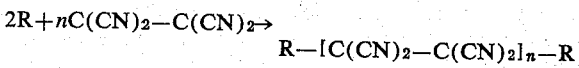

Along with this primary reaction other reactions with multiple units of tetracyanoethylene take place:

2R·+nC(CN)₂=C(CN)₂→
R—[C(CN)₂—C(CN)₂]ₙ—R

Since the various alpha,alpha'-azobisnitriles generate free radicals at different temperatures, the temperature for the reaction is preferably selected between that temperature where detectable decomposition of the particular azobisnitrile starts and the temperature where the decomposition is too violent to permit retaining the reacting system in the reaction container. The end of the reaction is readily observed by the termination of the nitrogen generation.

Tetracyanoethylene for use in the present invention can be prepared from malononitrile and sulfur monochloride. The following example in which all parts are by weight unless otherwise stated, illustrates this invention.

Example

A mixture of 492 parts of alpha,alpha'-azodiisobutyronitrile, 128 parts of tetracyanoethylene and 13,200 parts of dry benzene is refluxed for 8 hours. The solvent is evaporated under an atmosphere of nitrogen. The solid brown residue (535 parts) is sublimed at 85° C./1 mm. for 8 hours to give 177 parts (43%) of tetramethylsuccinonitrile. At 100° C./1 mm., 6 parts (2%) of additional tetramethylsuccinonitrile is sublimed along with a small amount of oil. At 120° C./0.8 mm. over a period of 18 hours, 97 parts (37%) of a white solid sublimes. The residue (which contains 2,3,3,4,4,5,5,6,6,7-decacyano-2,7-dimethyloctane) is involatile. Resublimation of the white solid gives crystals of 2,3,3,4,4,5-hexacyano-2,5-dimethylhexane with a melting point 150–151° C.

Analysis.—Calc'd. for C₁₄H₁₂N₆: C, 63.62; H, 4.58; N, 31.80. Found: C, 63.88; H, 4.71; N, 32.12.

It will be understood that the above example is merely illustrative and that the present invention broadly comprises compounds of the formula

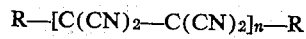

where $n$ is an integer from 1 to 2, inclusive, and R is an organic radical containing a tertiary carbon bonded to the central unit and bearing a single cyano group, and the preparation of these compounds by reacting tetracyanoethylene with an alpha,alpha'-azobisnitrile as herein characterized.

The preparation of various new compounds of the present invention is, of course, dependent on the alpha-alpha'-azobisnitrile reacted with the tetracyanoethylene. For example, if alpha-alpha'-azobis(alpha-isobutyl-gamma-methylvaleronitrile) is employed, 4,5,5,6,6,7-hexacyano-4,7-diisobutyl-2,9-dimethyldecane is obtained. If alpha,alpha'-azobis(alpha-phenylpropionitrile) is employed, 2,3,3,4,4,5-hexacyano-2,5-diphenylhexane is obtained. If alpha,alpha' - azobis(alpha - cyclopropylpropionitrile) is employed, 2,3,3,4,4,5-hexacyano-2,5,-dicyclopropylhexane is obtained. If 1,1'-azodicyclohexanecarbonitrile is employed, 1,1'-(tetracyanoethylene)-dicyclohexanecarbonitrile is obtained. If alpha,alpha'-azobis(alpha, gamma-dimethyl-gamma-methoxyvaleronitrile) is employed, 4,5,5,-6,6,7-hexacyano-2,9-dimethoxy-4,7-dimethyldecane is obtained. If alpha-alpha'-azobis(alpha-methyl-gamma-carboxybutyronitrile) is employed, the primary product is 3,4,4,5,5,6-hexacyano-3,6-dimethylsuberic acid and the secondary product is 3,4,4,5,5,6,6,7,7,8-decacyano-3,8-dimethylsebacic acid.

The present invention is generic to symmetrical compounds having central 1,2,2,3,3,4-hexacyanobutylene and 1,2,2,3,3,4,4,5,5,6-decacyanohexylene units in which carbon atoms 1,4 and 1,6, respectively, have both of their remaining bonds connected to separate carbon atoms in alkyl, cycloalkyl, alkoxyalkyl, carboxyalkyl or aryl groups, including the compounds in which both remaining bonds of any one of these respective carbon atoms are connected to separate carbon atoms in an aliphatic diradical.

The process of the present invention is generic to the reaction of one or two moles of tetracyanoethylene with one mole of an alpha,alpha'-azobisnitrile in which the alpha carbon of said nitrile is connected to separate carbon atoms in alkyl, cycloalkyl, alkoxyalkyl, carboxyalkyl, or aryl groups, including the compounds in which both bonds of these alpha carbon atoms are connected to separate carbon atoms in an aliphatic diradical.

To facilitate agitation and heat transfer, it is preferred to carry out the reaction of this invention in an inert liquid medium. Suitable media are illustrated by the aliphatic and aromatic hydrocarbons and their ethers.

The temperature range in which the process of the present invention may be carried out is the temperature range in which the particular azonitrile being employed is steadily and controllably decomposed to yield free radicals. As is known in the art, this temperature range differs for each azonitrile, but in general the optimum temperature ranges for any given azonitrile will be between 0° C. and 200° C.

The compounds of the present invention are useful as insecticides and fumigants since when heated with caustic materials such as sodium hydroxide, sodium carbonate, and the like, they are slowly decomposed with generation of hydrogen cyanide.

The compounds of the present invention are further useful for the preparation of a new class of multispiromultidicarboximides which are obtained when the cyano compounds of the present invention are hydrolyzed in aqueous solutions of strong acids, particularly sulfuric acid. Such hydrolysis does not proceed to completion to form the multicarboxylic acid corresponding to the cyano compound which was the starting material, but the hydrolysis stops with the formation of cyclic imides from pairs of adjacent cyano groups. Thus, 2,3,3,4,4,5-hexacyano-2,5-dimethylhexane is hydrolyzed to 2,5-dimethylhexane-(2,3) (3,4) (4,5)-tris(dicarboximide) which has the following probable formula

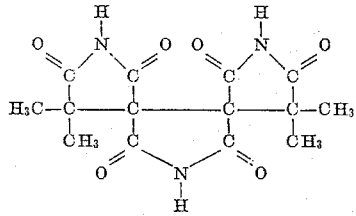

This trimide is highly useful as a crosslinking agent for polymeric materials and is readily converted to crosslinked polyimides by reaction with selected diamines.

As many apparently widely different embodiments of this invention may be made without departing from the spirit and scope thereof, it is to be understood that the invention is not limited to the specific embodiments thereof except as defined in the appended claims.

The invention claimed is:

1. A compound of the formula R—[C(CN)$_2$—C(CN)$_2$]$_n$—R where $n$ is an integer from 1 to 2, inclusive, and R is an organic radical containing a tertiary carbon bonded to the central unit and bearing a single cyano group.

2. A symmetrical compound having a central 1,2,2,3,3,4-hexacyano-butylene unit in which carbons 1 and 4 have both their remaining bonds connected to separate carbons in radicals from the group consisting of alkyl, cycloalkyl, alkoxyalkyl, carboxyalkyl, and aryl radicals.

3. A symmetrical compound as recited in claim 2 wherein said carbons 1 and 4 have both their remaining bonds connected to separate carbons in alkyl radicals.

4. A symmetrical compound having a central 1,2,2,3,3,4,4,5,5,6-decacyanohexylene unit in which carbons 1 and 6 have both their remaining bonds connected to separate carbons in radicals from the group consisting of alkyl, cycloalkyl, alkoxyalkyl, carboxyalkyl, and aryl radicals.

5. A symmetrical compound as recited in claim 4 wherein said carbons 1 and 6 have both their remaining bonds connected to separate carbons in alkyl radicals.

6. Process of preparing symmetrical cyano-containing compounds which comprises reacting tetracyanoethylene with an alpha,alpha'-azobisnitrile having bonded to each nitrogen of said azo, —N=N—, group a tertiary carbon atom bearing a single cyano group in the proportion of one mole of said tetracyanoethylene to at least one-half mole of said alpha,alpha'-azobisnitrile.

7. Process of preparing symmetrical cyano-containing compounds which comprises reacting tetracyanoethylene with an alpha,alpha'-azobisnitrile having bonded to each nitrogen of said azo, —N=N—, group a tertiary carbon atom bearing a single cyano group and having both its remaining bonds connected to separate carbons in radicals from the group consisting of alkyl, cycloalkyl, alkoxyalkyl, carboxyalkyl, and aryl radicals, in the proportion of one mole of said tetracyanoethylene to at least one-half mole of said alpha,alpha'-azobisnitrile.

8. Process as set forth in claim 7 wherein said reaction is carried out in an inert organic liquid at a temperature between 0° C. and 200° C. at which said alpha,alpha'-azobisnitrile will decompose to yield free radicals.

No references cited.